United States Patent
Sikharulidze

(10) Patent No.: US 7,264,851 B2
(45) Date of Patent: Sep. 4, 2007

(54) BISTABLE NEMATIC LIQUID CRYSTAL DISPLAY DEVICE

(75) Inventor: David Sikharulidze, Bristol (GB)

(73) Assignee: Hewlett Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/698,028

(22) Filed: Oct. 31, 2003

(65) Prior Publication Data

US 2004/0144953 A1 Jul. 29, 2004

(30) Foreign Application Priority Data

Oct. 31, 2002 (GB) ................................ 0225405.0

(51) Int. Cl.
G02F 1/167 (2006.01)
G02F 1/139 (2006.01)

(52) U.S. Cl. .................. 428/1.1; 252/299.4; 349/37; 349/128; 349/166; 349/177

(58) Field of Classification Search ................ 428/1.1; 252/299.01, 299.4; 349/37, 128, 166, 177
See application file for complete search history.

(56) References Cited

U.S. PATENT DOCUMENTS

| | | | |
|---|---|---|---|
| 4,305,807 A | | 12/1981 | Somlyody ............... 204/299 R |
| 4,681,404 A | * | 7/1987 | Okada et al. .................. 349/37 |
| 5,357,358 A | * | 10/1994 | Durand et al. ............... 349/125 |
| 5,457,235 A | * | 10/1995 | Wand et al. .................... 568/65 |
| 5,498,762 A | * | 3/1996 | Eguchi ......................... 428/1.2 |
| 5,529,818 A | * | 6/1996 | Tsuda et al. .................. 428/1.2 |
| 5,626,791 A | * | 5/1997 | Fenkl et al. ............. 252/299.01 |
| 5,729,320 A | * | 3/1998 | Eidenschink et al. ........ 349/166 |
| 5,766,508 A | * | 6/1998 | Kawasumi et al. ..... 252/299.01 |
| 5,956,113 A | * | 9/1999 | Crawford .................... 349/185 |
| 6,016,133 A | * | 1/2000 | Nito et al. ..................... 345/89 |
| 6,172,720 B1 | * | 1/2001 | Khan et al. .................... 349/35 |
| 6,515,649 B1 | * | 2/2003 | Albert et al. ................ 345/107 |

FOREIGN PATENT DOCUMENTS

GB 2 324 620 10/1998

OTHER PUBLICATIONS

Bryan-Brown et al., WO 97/39382, Oct. 23, 1997.*
Takano et al, Abstract, JP 405061021A, Mar. 12, 1993.*
Takano et al., JPO website machine English translation of JP 05-061021, Mar. 1993.*
Thurston et al., "Mechanically Bistable Liquid-Crystal Display Structures," IEEE Transactions on Electron Devices, vol. ED-27, No. 11, Nov. 1980, pp. 2069-2080.
Dozov et al., "Fast bistable nematic display using monostable surface switching," Appl. Phys. Lett. 70 (9), Mar. 3, 1997, pp. 1179-1181.

(Continued)

Primary Examiner—Rena Dye
Assistant Examiner—Sow-Fun Hon

(57) ABSTRACT

A bistable nematic liquid crystal display device comprises two cell walls enclosing a layer of nematic liquid crystal material having finely divided solid particles dispersed therein. At least one electrode on each cell wall applies an electric field across at least some of the liquid crystal material. Surface alignments on the inner surface of both cell walls induce adjacent molecules of the liquid crystal material to adopt desired orientations. The liquid crystal material adopts two different stable molecular configurations according to the polarity of applied electric field pulses.

30 Claims, 10 Drawing Sheets

OTHER PUBLICATIONS

Bartolino et al., "Polarity sensitive electrooptical response in a nematic liquid crystal-polymer mixture," Jounal of Applied Physics, vol. 85, No. 5, Mar. 1, 1999, pp. 2870-2874.

Eidenschink et al., "Static Scattering in Filled Nematic: New Liquid Crystal Display Technique," Electronics Letters, vol. 27, No. 13, Jun. 20, 1991, pp. 1195-1196.

Glushchenko et al., "Memory effect in filled nematic liquid crystals," Liquid Crystals, vol. 23, No. 2 (1997), pp. 241-246.

Kawasumi et al., "Nematic liquid crystal/clay mineral composites," Materials Science and Engineering C 6 (1998), pp. 135-143.

Kreuzer et al., "New liquid crystal display with bistability and selective erasure using scattering in filled nematics," Appl. Phys. Lett. 62 (15), Apr. 12, 1993, pp. 1712-1714.

Lee et al., "Dynamic behavior of silica particles in liquid crystals under an ac applied voltage," Proceedings of 13th International Conference on Dielectric Liquids (ICDL '99), Jul. 1999, pp. 571-574.

* cited by examiner

BISTABLE NEMATIC LIQUID CRYSTAL DISPLAY DEVICE

CROSS-REFERENCE TO RELATED APPLICATIONS

Not Applicable

STATEMENT REGARDING FEDERALLY FUNDED RESEARCH OR DEVELOPMENT

Not Applicable

INCORPORATION BY REFERENCE OF MATERIAL SUBMITTED ON COMPACT DISC

Not Applicable

BACKGROUND OF THE INVENTION

1. Technical Field

This invention relates to bistable nematic liquid crystal display devices.

2. Background Art

Pixel bistability is a desirable attribute for a liquid crystal display ("LCD") because this eliminates the need constantly to refresh the display or to employ a silicon memory device behind each pixel, which becomes prohibitively expensive as the number of pixels increases. With bistability, only pixels that need to be changed need addressing, and simple matrix addressing may be employed.

Bistable LCDs are known which employ chiral tilted smectic liquid crystals, for example chiral smectic C materials, which exhibit ferroelectricity. However, there are many problems with ferroelectric LCDs, including a paucity of stable, room-temperature materials, wide-temperature-range materials, and structural defects which result from mechanical stress. Because of the problems associated with ferroelectric smectic materials it is desirable to fabricate bistable LCDs using nematic liquid crystals ("LCs").

U.S. Pat. No. 4,333,708 discloses a multistable nematic LC device in which switching between stable configurations is by the movement of disclinations in response to electric fields.

In WO 91/11747 and WO 92/00546 it is proposed to provide a bistable surface by careful control of the thickness and evaporation of SiO coatings. A first stable planar orientation of the director could be obtained, and a second stable orientation in which the director is at an azimuthal angle (in the plane of the surface) of 90° to the first orientation in the plane of the surface, and tilted by around 30°.

In "Mechanically Bistable Liquid-Crystal Display Structures", R N Thurston et al, IEEE Trans. on Elec. Devices, Vol. ED-27, No. 11, November 1980, there are described two bistable nematic LC modes which are called "vertical-horizontal" and "horizontal-horizontal". In the vertical-horizontal mode, both cell walls are treated to give a roughly 45° tilt which permits the directors to be switched between two states in a plane which is perpendicular to the major surfaces of the device. In the horizontal-horizontal mode, the director is switchable between two angles in a plane parallel to the major surfaces of the device.

A bistable nematic display using monostable surface switching has been proposed by I. Dozov et al, *Appl. Phys. Lett.* 70 (9), 1179, 3 Mar. 1997. Switching in a thin cell is achieved between a low twist and a high twist state by the application of short electric pulses. Both cell wall surfaces have planar anchorings. Hydrodynamically coupled breaking of both anchorings results in the high twist state, and breaking only one anchoring results in the low twist state.

Polarity-sensitive switching has been found in a nematic LC-polymer mixture: R. Bartolino et al, *J. Appl. Phys.* Vol. 85 No. 5, 2870, 1 Mar. 1999. An LC/prepolymer mixture is polymerised in a cell so as to produce a gradient of concentrated polymer across the cell. It is thought that an asymmetric space charge distribution causes asymmetric electro-optical behaviour. A strong negative current produces a scattering (bright) state, and a weak positive current permits a transition to a homeotropic (dark) state.

U.S. Pat. No. 5,796,459 discloses a bigrating alignment structure which are arranged for inducing bistable surface states with different azimuthal orientations. WO 97/14990 and WO 99/34251 describe the use of a monograting surface with a homeotropic local director, which has two stable states with different tilt angles within the same azimuthal plane. The homeotropic alignment is achieved by creating the monograting in a layer of material which causes spontaneous homeotropic orientation or, more practically, by coating the grating surface with a homeotropic inducing alignment agent such as lecithin. This grating surface is used to form a Zenithal Bistable Device or ZBD.

A bistable nematic device described in EP 1 139 151 has one cell wall that is provided with an array of upstanding features which have a shape and/or orientation to induce the local director to adopt two different tilt angles in substantially the same azimuthal direction. The arrangement is such that two stable molecular configurations can exist after suitable electrical signals have been applied. The features are typically microscopic posts, used to form a Post-Aligned Bistable Nematic device, or PABN.

Typically the depth of gratings or post alignment features of the ZBD or PABN devices is about 1 μm and the ratio depth/width is about 0.6. Gratings this deep are fairly challenging to replicate by mass manufacturing methods.

Bistable nematic displays have been described in which the nematic LC has dispersed in it nanoparticles which are believed to form structures that stabilise the LC in either a scattering state or a homeotropic (non-scattering) state. Switching between the states is achieved either by two-frequency addressing or by the action of a laser. Two frequency-addressable displays are described in: R. Eidenschink, W. H. De Jue "Static scattering in filled nematic: new liquid crystal display technique" *Electronics Letters* 20 Jun. 1991, vol. 27, No. 13, pp 1195-1196, A. Gluschenko et al "Memory effect in filled nematic liquid crystals" *Liquid Crystals*, 1997, vol. 23, No. 2, pp 241-246, and M. Kawasumi et al "Nematic liquid crystal/clay mineral composites" *Minerals Science and Engineering* C6 (1998), pp 135-143. Laser-writable displays are described in U.S. Pat. No. 5,532,952 and M. Kreuzer et al "New liquid crystal display with bistability and selective erasure using scattering in filled nematics" *Appl. Phys. Lett.*, 62(15), 12 Apr. 1993, pp 1712-1714. A study of particle dynamics in such systems is presented in S. Lee et al "Dynamic behaviour of silica particles in liquid crystals under an ac applied voltage" *Proc. of 13$^{th}$ Intern. Conf. on Dielectric Liquids* (ICDL'99), Nara, Japan, Jul. 20-25, 1999, pp 571-574.

Problems of two-frequency addressing include a paucity of suitable materials and increased complexity of the drive electronics. Laser-writable devices are costly and complex to manufacture, and the use of both heat and voltage to switch the LC is undesirable.

SUMMARY OF THE INVENTION

According to an aspect of the present invention a bistable liquid crystal display device comprises:

two cell walls enclosing a layer of a composition comprising nematic liquid crystal material having finely divided solid particles dispersed therein, at least one of the cell walls being translucent;

at least one electrode on each cell wall for applying an electric field across at least some of the liquid crystal material;

a first surface alignment on the inner surface of one cell wall for inducing adjacent molecules of the liquid crystal material to adopt a first orientation, and a second surface alignment on the inner surface of the other cell wall for inducing adjacent molecules of the liquid crystal material to adopt a second orientation which is different from the first orientation;

whereby the nematic liquid crystal material will adopt a first stable molecular configuration in response to a pulse of a unidirectional electric field of suitable magnitude and duration via the electrodes and will adopt a second stable molecular configuration in response to a similar pulse of opposite polarity, the second configuration being different from the first configuration.

The invention provides polarity-controlled switching because of the nature of the interactions between the dispersed particles and the LC molecules and so can be applied to LC cells with a range of alignment configurations.

The dispersed particles preferably have a size in the range 1 nm to 1000 nm, notably 1 to 500 nm. A particularly preferred size range is 5 to 50 nm. Suitable particles will be referred to herein as nanoparticles. The nanoparticles may be spherical or spheroidal. The nanoparticles are preferably present in a concentration of from 0.1 to 25% by weight of the composition. A particularly preferred range is 1 to 15%, notably 1 to 5%. Because of the small size of the nanoparticles, the observed optical effect is achieved substantially only by a reorientation of the LC molecules.

Drive electronics can be used to provide unidirectional (DC) pulses of appropriate magnitude, duration and polarity, in accordance with input data information. Suitable drive electronics are well known to those skilled in the art of electronics. It will be understood that the pulses can have a constant field strength or an AC component, providing that the overall field strength is sufficient to effect the switching to a stable state.

According to another aspect of the invention a bistable liquid crystal display device comprises:

two cell walls enclosing a layer of nematic liquid crystal material having finely divided solid particles dispersed therein, at least one of the cell walls being translucent;

at least one electrode on each cell wall for applying an electric field across at least some of the liquid crystal material;

a first surface alignment on the inner surface of one cell wall for inducing adjacent molecules of the liquid crystal material to adopt a first desired orientation;

a second surface alignment on the inner surface of the other cell wall for inducing adjacent molecules of the liquid crystal material to adopt a second desired orientation; and drive electronics connected to the electrodes, for applying pulses of DC electric fields of desired magnitude, polarity and duration between the electrodes, whereby the liquid crystal material adopts two different stable molecular configurations according to the polarity of the applied field.

Without limiting the invention in any way, we believe that the particles are or become charged by contact with the LC material, and that the display operates by an electrophoretic effect whereby charged particles migrate and aggregate at the cell wall electrode of opposite polarity, thereby screening the LC material from the effects of the surface alignment on that wall. Evidence for this mechanism is discussed in the detailed description.

Accordingly, a further aspect of the present invention relates to an electrophoretically controlled bistable liquid crystal display device comprising:

a first cell wall and a second cell wall enclosing a layer of nematic liquid crystal material, at least one of the cell walls being translucent;

the liquid crystal material having finely divided charged particles dispersed therein;

at least one electrode on each cell wall for applying an electric field across at least some of the liquid crystal material; and a first surface alignment on the inner surface of the first cell wall for inducing adjacent molecules of the liquid crystal material to adopt a first orientation, and a second surface alignment on the inner surface of the second cell wall for inducing adjacent molecules of the liquid crystal material to adopt a second orientation which is different from the first orientation;

whereby the liquid crystal material can be switched to a first stable molecular configuration by the application to the electrode of a DC electric field pulse of suitable field strength and duration to cause movement of charged particles to the first cell wall so as substantially to prevent the first surface alignment from influencing alignment of molecules of liquid crystal material in the layer; and the liquid crystal material can be switched from the first configuration to a second stable molecular configuration by the application to the electrode of a DC electric field pulse of suitable field strength and duration and opposite polarity so as to cause movement of sufficient charged particles away from the first cell wall to permit the first surface alignment to influence alignment of molecules of liquid crystal material in the layer.

The nature of the molecular configurations depends on the surface alignments. A combination of planar alignment at one surface and homeotropic alignment at the other provides a homeoplanar alignment which can be stably switched to homeotropic alignment. A combination of planar alignments at both surfaces with the alignment directions different (notably at 90° to each other) provides an initial twisted nematic structure which can be selectively realigned to either of two homeoplanar alignments with the planar direction determined by one or other of the surface alignments. The switching of these display modes is described in more detail below.

Typically, means for distinguishing between different optical states is provided in the finished product, for example a polarizer on an external surface of each display substrate. Where the liquid crystal is dyed, this may provide sufficient contrast, or a single polarizer may be employed to enhance the contrast.

BRIEF DESCRIPTION OF THE DRAWINGS

The invention will now be further described, by way of example only, with reference to the following drawings.

DETAILED DESCRIPTION OF THE DRAWINGS

Figure 1:
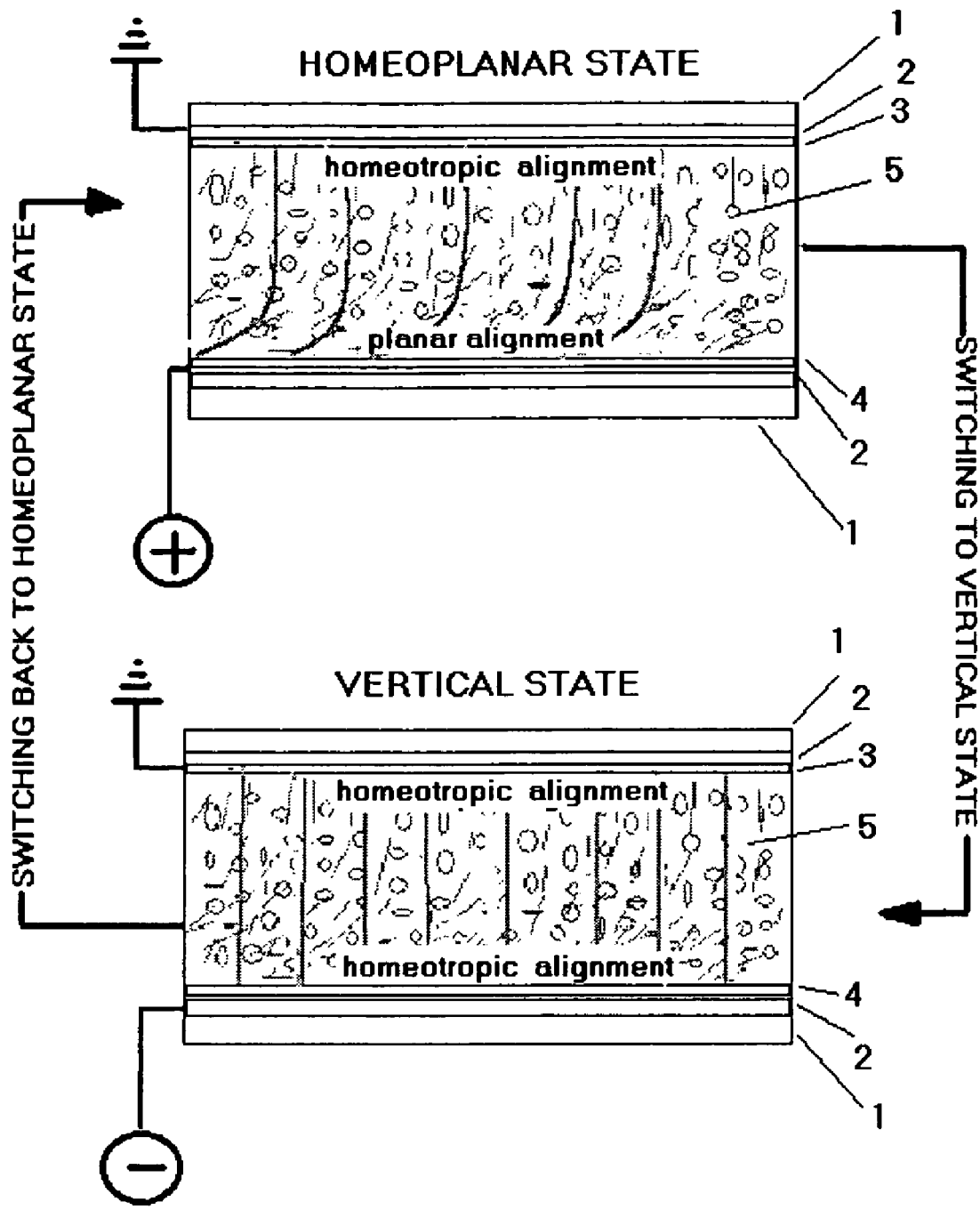
FIG. 1 shows switching in a device in accordance with one embodiment of the present invention.

FIG. 1 shows a homeoplanar (HAN) cell comprising first and second opposed substrates (cell walls) 1 each of which carries transparent electrodes 2. One substrate of this cell is provided with a homeotropic surface alignment 3, which provides vertical alignment of molecules close to surface. The other substrate is provided with a planar alignment 4 which provides parallel alignment to molecules close to that surface. The cell was filled with a composition comprising a mixture 5 of nematic LC with silica nanoparticles dispersed therein. Percentages for nanoparticles specified herein are weight percentages (w/w) relative to the composition.

Between crossed polarizers 6 the cell's transmission is described by:

$$I_{out} = I_0 \sin^2 2\alpha \sin^2(\pi d \Delta n / \lambda).$$

where $I_0$=input light, $\alpha$=angle between input polarizer and director (orientation of LC molecules), d=cell thickness, $\Delta n$=optical anisotropy, $\lambda$=light wavelength.

Figure 2:
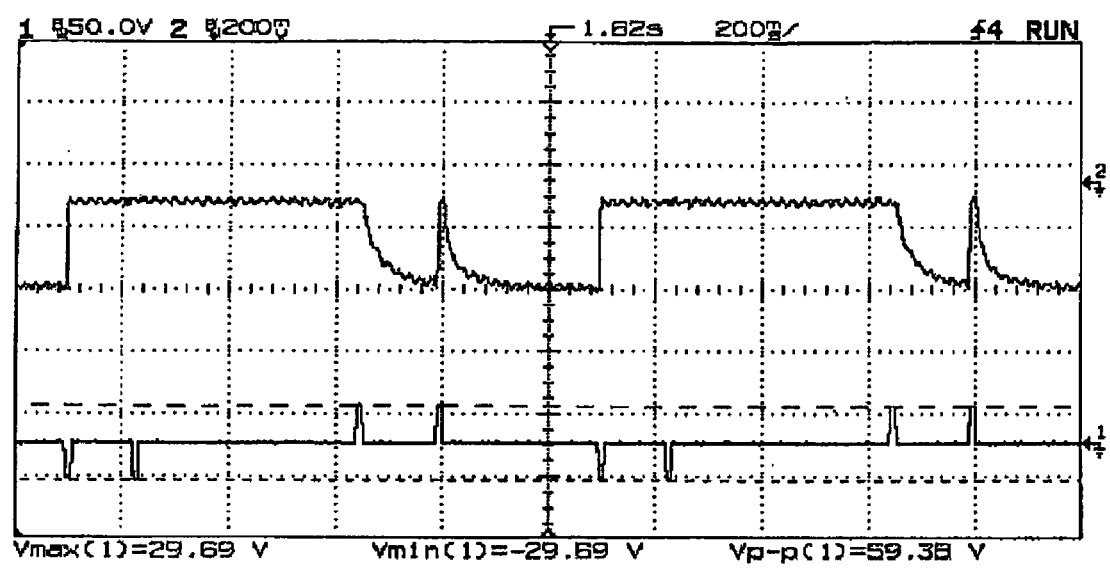
FIGS. 2 to 4 are graphs showing electro-optical responses of various devices in accordance with embodiments of the present invention.
Figure 3A:
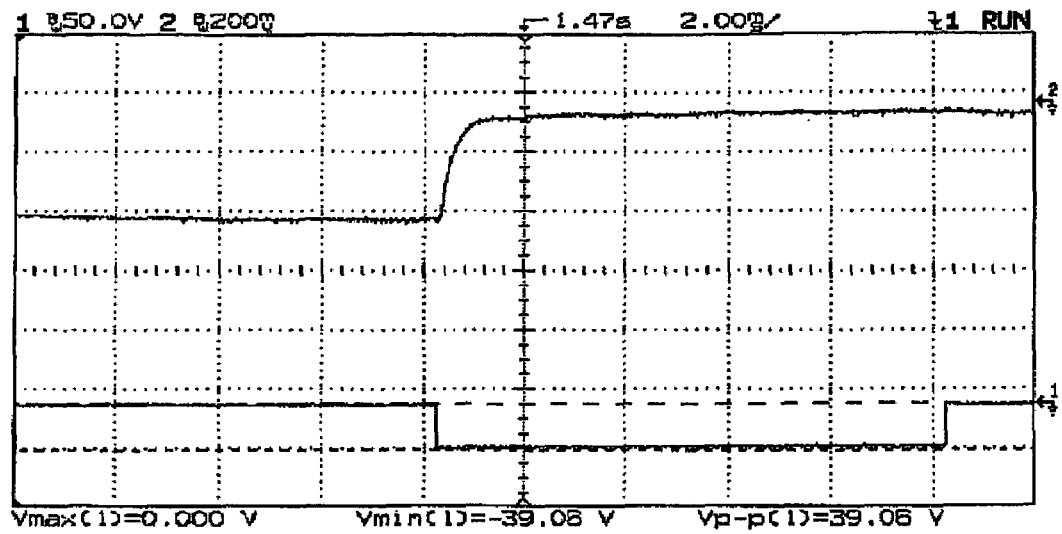
Figure 3B:
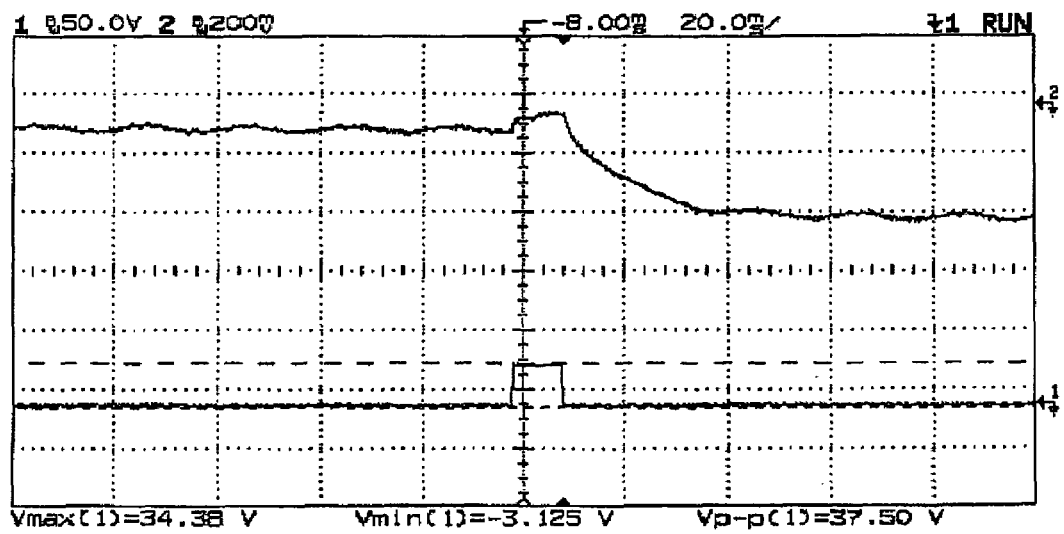

FIG. 2 shows the cell's transmission under applied electrical pulses between crossed polarizers ($\alpha$=45° with respect to LC director). The cell studied contained dyed nematic (ZLI3572 Merck) and 2% silica nanoparticles (Aerosil® R974 from Degussa-Huls). The nanoparticles have an average primary particle size of 12 nm. They comprise fumed silica after treated with dimethyldichlorosilane. The $SiO_2$ content of the nanoparticles is >99.8%. The cell thickness was 10 μm. 15 ms 30 V pulses were applied. We found that depending on the polarity of the applied pulses the cell behaves differently. When the positive sign is connected to the planar side the cell switches to a homeotropic vertical state and this state is memorized. Between crossed polarizers this state appears dark, so LC molecules stay vertical and $\Delta n$=0. In this state applying the same polarity pulse does not produce any change. However, a pulse with opposite polarity (minus to planar side) results in switching to the initial homeoplanar state. The next pulse of the same polarity causes an electro-optical response similar to that of a pure nematic LC without memorizing. FIG. 2 shows that the behaviour of the fronts of switching on and switching off is different. The switching on (FIG. 3a) is much sharper and is determined by dielectric interaction with electrical field $t_{on} \alpha \gamma / \Delta \in E^2$, where $\gamma$=viscosity, $\Delta \in$=dielectric anisotropy, E=electrical field. This time is usually from 50 μs to 1 ms for nematic LCs and depends on electric field and dielectric anisotropy. The switching off (FIG. 3b) goes slowly and is consistent with free relaxation of the molecules to their initial state due to elastic deformation. This time is described by $t_{off} \alpha \gamma d^2$ for nematics and usually varies from 10 to 50 ms. In the cell with nanoparticles the vertical state is memorized by an applied pulse with suitable polarity (positive sign to planar side for the specified example).

We discovered that the polarity effect depends on the nature of the nanoparticles and their tendency to acquire positive or negative triboelectric charge. The silica nanoparticles usually have a tendency to acquire negative charge. The properties of nanoparticle types which have a tendency to acquire triboelectric negative or positive charge for application to toner are given in the description of Degussa-Huls about Aerosil® products). In the suspension of liquid crystal the nanoparticles acquire a surface charge, which we believe is due to formation of the electrical double layer, which usually is provided by most of the oxide surface. This effect can be significantly increased by special treatment of particles' surfaces.

Responsibility of the nanoparticles for polarity controlled switching was confirmed by comparison of the homeoplanar LC cell with silica nanoparticles having a tendency to acquire negative charge and a similar cell which was filled with LC doped by nanoparticles having tendency to acquire positive charge. For this purpose we used aluminium oxide C (size 13 nm) or specially treated silica R504 (both from Degussa-Huls), which were developed for application to positive toners.

Figure 4A:
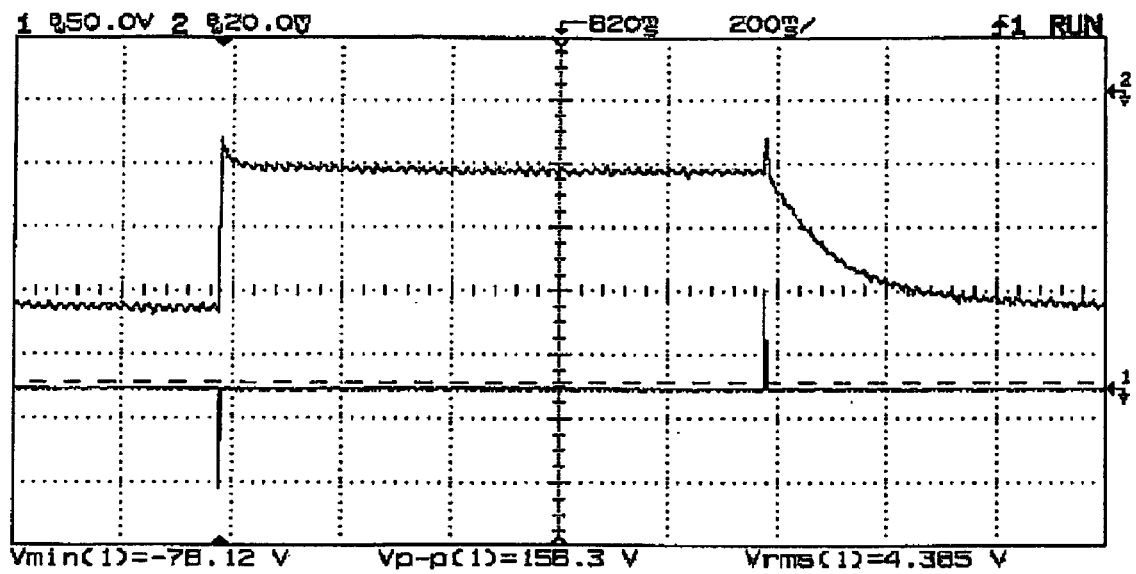
Figure 4B:
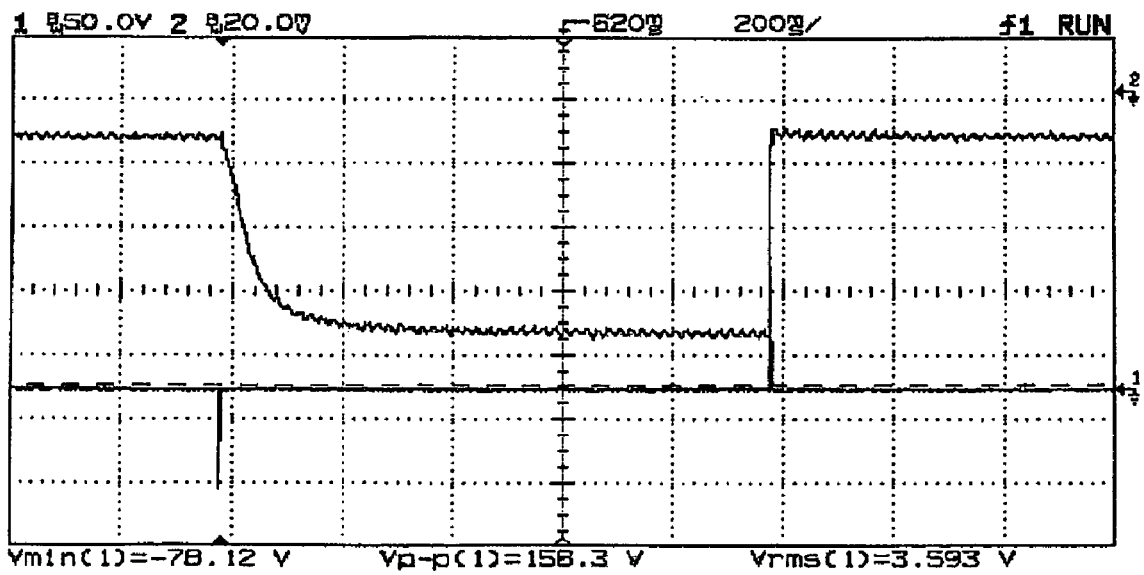

FIG. 4 shows a comparison of switching in HAN cells with (a) "positively" charged nanoparticles (aluminium oxide C) and (b) "negatively" charged nanoparticles (silica R812). Ground is connected to the homeotropic side. In both cases the LC is E7 (Merck) with 2% of the nanoparticles and a 3 μm cell gap. In both graphs of FIG. 4 electrical pulses (5 ms) are shown in the lower line and the electro-optical response of the cell between crossed polarizers is shown in the upper line. In FIG. 4a, connecting the minus sign to the planar side switches the display to a memorized homeotropic state, and positive polarity on the planar side induces switching back to the initial surface aligned state. In FIG. 4b, connecting the positive sign to the planar side switches the display to a memorized homeotropic state, and negative polarity on the planar side induces switching back to the initial surface aligned state. The cells thus show opposite switching behaviour depending on polarity.

Figure 5:
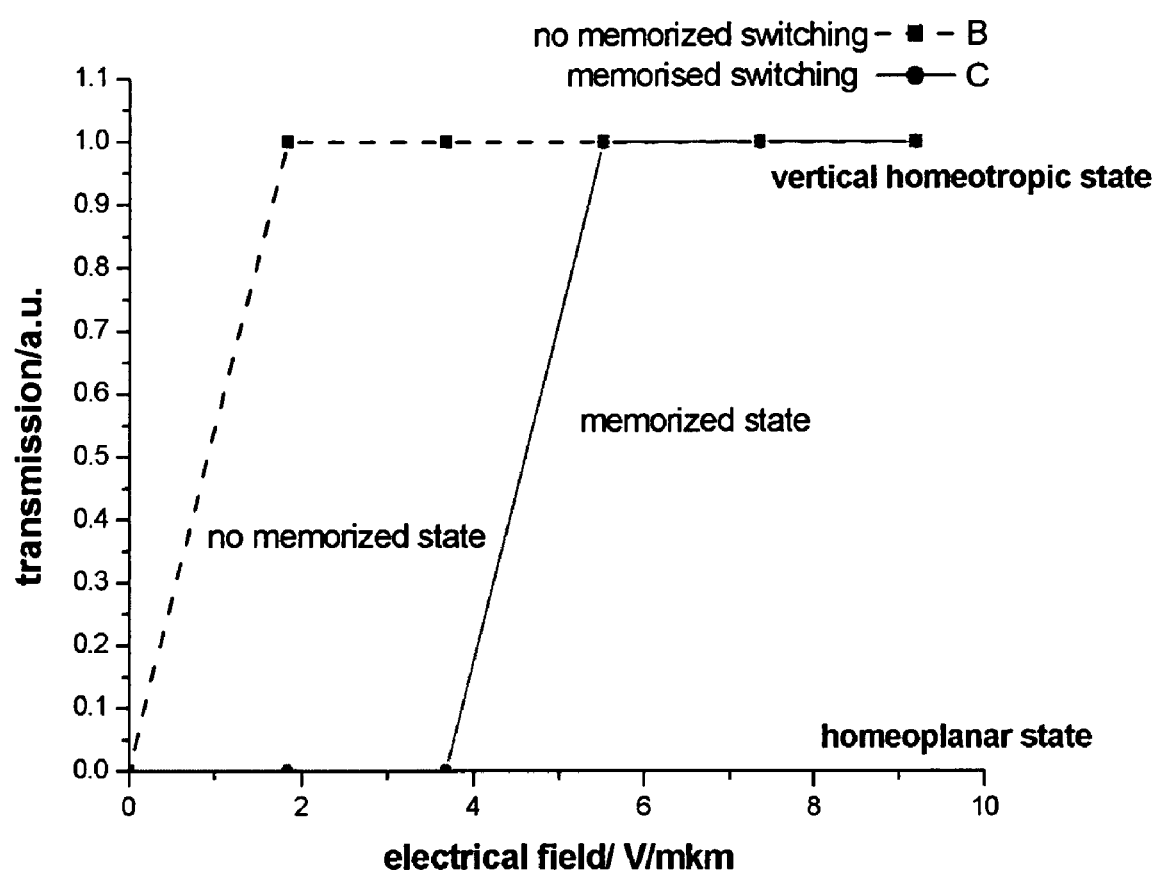
FIG. 5 shows electro-optical switching to the memorised state of a device in accordance with FIG. 1, filled with silica nanoparticles.

Referring now to FIG. 5, electro-optical switching to the memorized state is shown for a nematic HAN cell filled with silica (E7 and 2% R812). The cell thickness was 10 μm; pulse length was 5 ms. A higher voltage is required to switch to the memorized state than the voltage for the homeotropic reorientation.

Figure 6A:
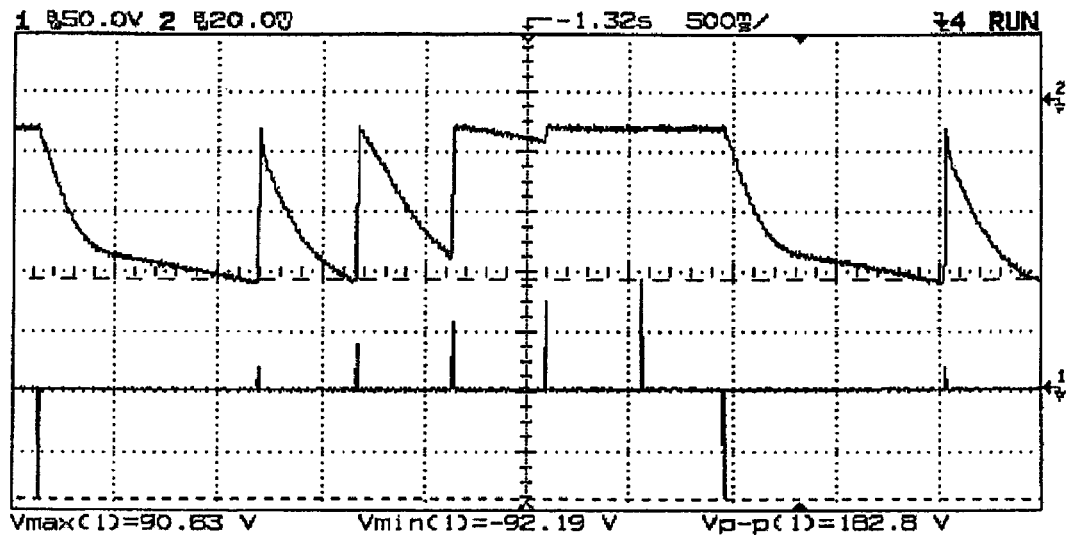
FIG. 6 shows a comparison of bistable switching at different temperatures in a device in accordance with an embodiment of the invention.
Figure 6B:
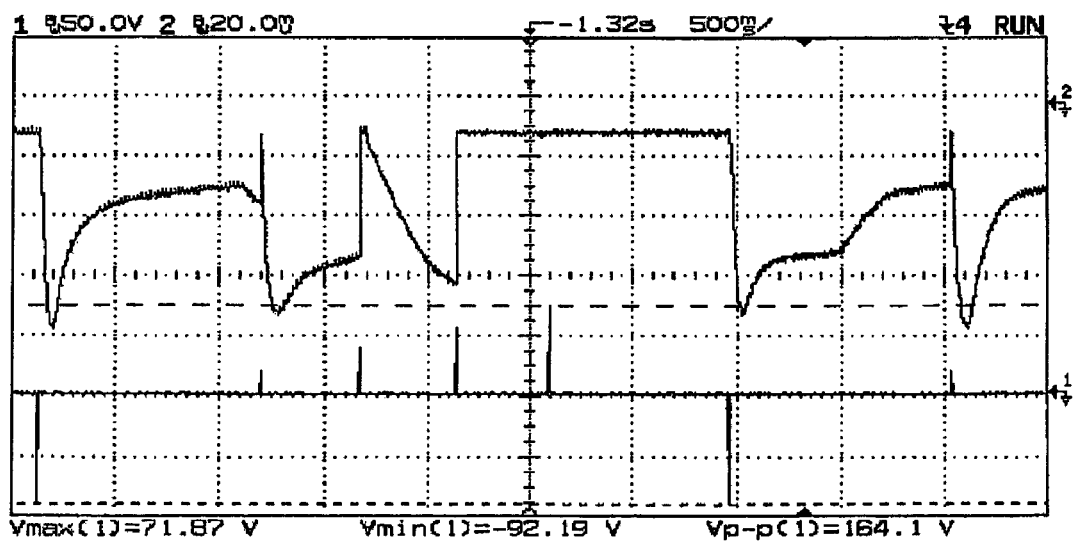

FIG. 6a,b represents the evolution of electro-optical response of the cell with applied bursts of unidirectional electric field pulses of increasing amplitude: 0, 18.6 V, 36.8 V, 55.2 V, 73.6 V, 92 V. (FIG. 6 correlates with FIG. 5 and shows that although switching to the homeotropic state is observed for a pulse with 18 V, the memorized effect requires a pulse with 55 V for a cell with thickness 10 μm.). It should be noted that the cell continues to be capable of bistable switching with increasing temperature. The comparison of the switching shows that there is not much difference between memorized effects at room temperature and at 60° C. Only the back switching is faster, because of reduction of the viscosity $\gamma$ at higher temperature. These results suggest that the observed polarity controlled effect is distinct from known devices in which a memory effect is based on the creation of a network of nanoparticles along the cell, and back switching is provided only by thermal heating of the cell (U.S. Pat. No. 5,532,952, and M. Kreuzer et al "New liquid crystal display with bistability and selective erasure using scattering in filled nematics" *Appl. Phys. Lett.,* 62(15), 12 Apr. 1993, pp 1712-1714)

Figure 7:
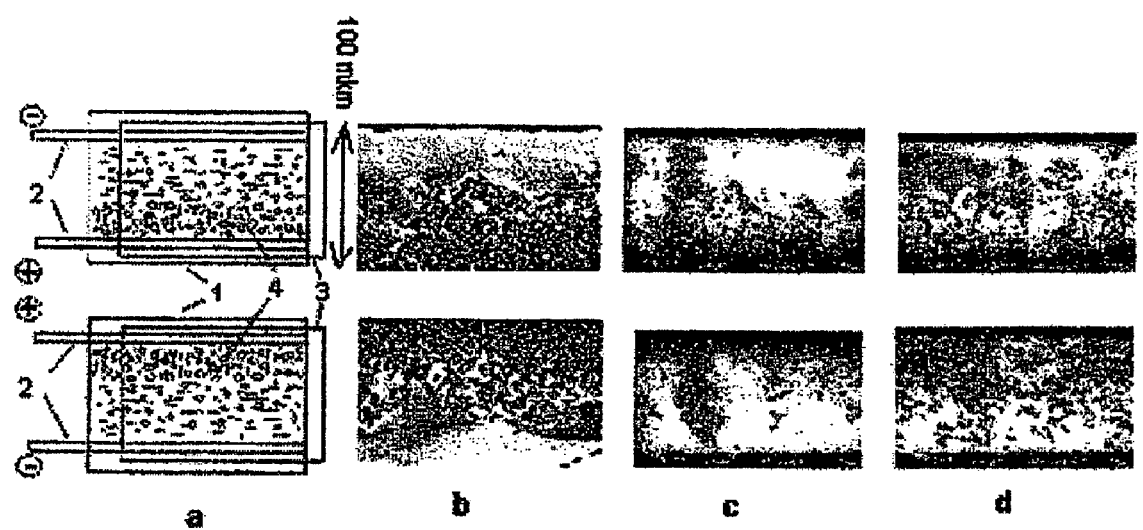
FIG. 7 shows pictures of the electrophoretic migration of nanoparticles between in-plane electrodes, for electric fields of opposite polarity.

We believe that the invention provides a different mechanism of bistable switching—electrophoretically controlled bistability in LCDs. According to this mechanism, the electrophoretric effect, which takes place in the cell, is responsible for the memorized effect. This was tested in a cell with in-plane electrodes 2, as shown in FIG. 7. The mixture of LC with nanoparticles 5 was deposited over a bottom substrate 1a and covered the area between the electrodes. A thin (100 µm) glass plate 1b covered the LC layer. The cell was observed by polarizing microscopy. Electrical pulses with reversed polarity were applied to the electrodes 2. In FIGS. 7a,b are given pictures of the switching process between in-plane electrodes for a composition comprising liquid crystal E7 doped with 2% OX50 silica (40 nm). In the texture of the mixture isobserved quite big sIze clusters, which are formed by aggregation and enables the observation of the migration process. In the beginning the aggregates are randomly distributed in the LC. After application of the pulse the aggregates begin the moving towards the electrode with suitable polarity, in this case towards the electrode with a plus sign. Depending on amplitude and duration of pulse they are fully collected close to the electrode, forming a close-packed network of nanoparticles. This state is stable after switching off the electrical pulse. After reversing polarity the aggregates are moved and collected close to the second electrode, and the area close to the first electrode is cleaned of close-packed nanoparticles networks. The same behaviour takes place for a mixture with smaller size (7 nm) nanoparticles. In this case the network of the nanoparticles is observed as a dense layer, which moves between in-plane electrodes. The mobility of nanoparticles was determined from the expression for drifting under an electrical field $t_{dr}=d^2/\mu V$, where d is the distance between electrodes, V=applied voltage, µ=mobility. The distance between electrodes is 100 µm and there is optically observed that the pulse 100 ms with amplitude 200 V forces full drifting of the nanoparticles from one electrode to the second electrode. Consequently we have. determined the mobility $\mu=d^2/t_f V=10^{-4}$ cm$^2$/$10^{-1}$ s $2.10^2$ V=$5.10^{-6}$ cm$^2$/Vs. which is a typical value for mobility of solid nanoparticles in liquids.

Figure 8:
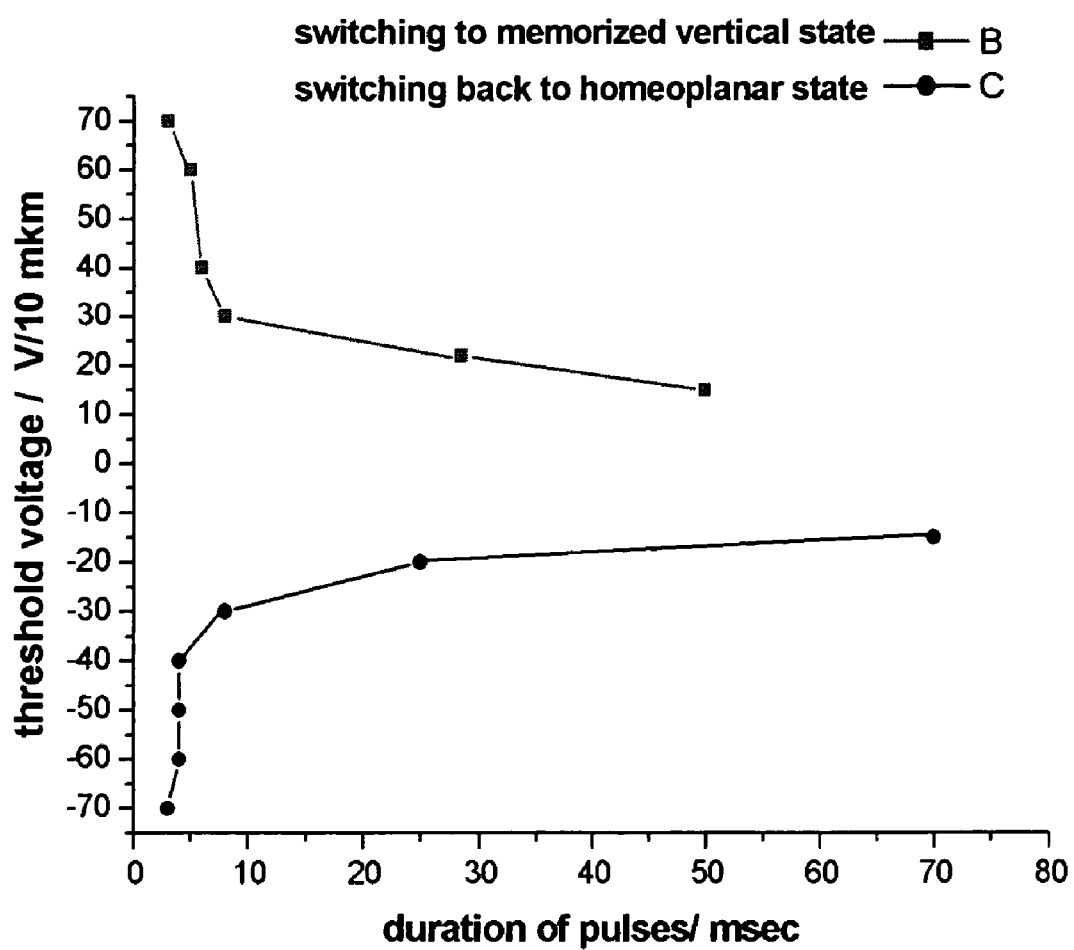
FIG. 8 is a graph of threshold of switching to the memorised state and back against pulse duration.

Accordingly in the cell with thickness 10 µm and applied voltage 50 V, the duration of the pulse which provides a bistable switching will be equal to $t_{dr}=d^2/\mu V=10^{-6}$ cm$^2$/(5 10$^{-6}$ cm$^2$/Vs) 50 V=4 ms. The comparison of this value with FIG. 8 shows a good coincidence, that provides supporting evidence for the electrophoretic nature of the memorized effect.

FIG. 7b shows migration of nanoparticles in the cell with a free top surface. FIGS. 7c and 7d show the same effect in the cell with the top thin glass plate 1b. In FIGS. 7b and 7c show the cell after application of 200 V electrical pulses of duration 200 ms, which provides full attraction of the nanoparticles close to the positive electrode. In FIG. 7d, pulses of the same 200 V were applied, but of 100 ms duration. In this case a less dense "loose" network of nanoparticles is formed, which extends into the cell's bulk.

From the results above, we can conclude that the electrophoretic effect is responsible for the controlled memorized effect which takes place in the nematic cell with nanoparticles.

After application of an electric field, the LC molecules are oriented homeotropically but because the pulse parameters of voltage/duration are not enough for a strong electrophoretic effect, the distribution of the particles along the cell will be unchanged. So close to the planar surface a thin layer of LC molecules remains in an unchanged planar orientation, because of the strong anchoring of the molecules with the alignment layer. So, from this state the orientation of the molecules will revert to a homeoplanar alignment after switching off the pulse. In this condition the cell behaves as a conventional nematic cell. With increasing of the electrical field a strong electrophoretic effect takes place and full alignment of the molecules to the vertical state will be accompanied by attraction of the particles towards the planar side, which results in creation of a strong close-packed structure of nanoparticles with vertical aligned molecules of LC. In other words the planar surface will be covered by a network of close-packed particles, which screens the influence of the planar surface and the surface properties will be totally changed.

This state is stable after switch-off of the electrical pulse and as our experiments show, it can be saved more than one year. When polarity is reversed, the minus sign to the planar side causes rearrangement and repulsing of the nanoparticles network, towards the opposite side and the planar surface will be substantially cleaned of nanoparticles. As a result the molecules of the LC get freedom to reorientate and, under the influence of the strong anchoring forces of the planar alignment, relax back to the parallel planar state. So the switching between two stable states will be repeated every time the polarity of the electrical pulse is reversed.

This switching mechanism gives the possibility to realize gray scale switching, so the pulse parameters of voltage/duration control the density of nanoparticle networks in bulk and on the surface. This is also supported by FIGS. 5 and 7.

It should be noted that because of the small size of the nanoparticles, the optics of the cell will be fully determined by the liquid crystal layer as in conventional nematic cells. At the same time the stimulated switching and stabilisation of the switched states are controlled by the nanoparticles' optically "hidden" electrophoretic effect. Taking into account that this effect dramatically changes and stabilizes alignment close to the surface with the suitable sign of the polarity, it is very important to choose the LC cell's aligned configuration which enables the memorized state to be optically clearly distinguished from the previous state.

In the present invention the switching on and switching off processes need equal values of amplitude/duration with opposite polarity of electrical pulses, as shown in FIG. 8., because of the electrophoretic mechanism of the controlling process. FIG. 8 shows the threshold of switching to the memorized state and back switching depending on pulse duration; they are linked according to the expression $t_{dr}=d^2/\mu V$. The results are for a 10 µm HAN cell filled with dyed nematic (ZLI3572) with 5% silica (Aerosil® R974).

Figure 9A:
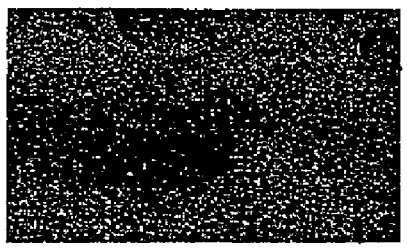
FIGS. 9 to 11 are photomicrographs of a device in accordance with an embodiment of the invention after various treatments.
Figure 9B:
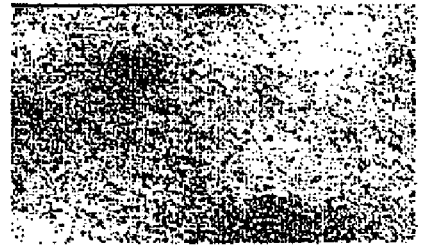
Figure 10A:
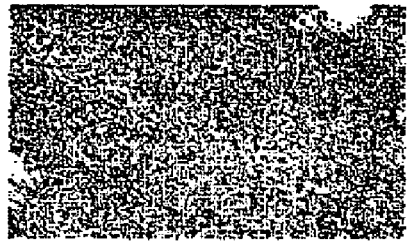
Figure 10B:
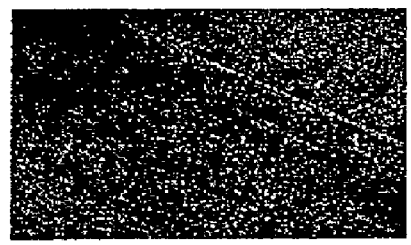
Figure 11A:
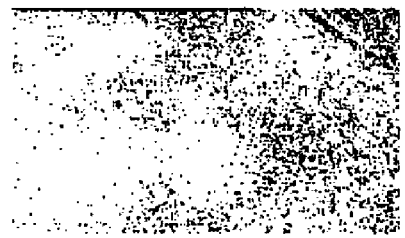
Figure 11B:
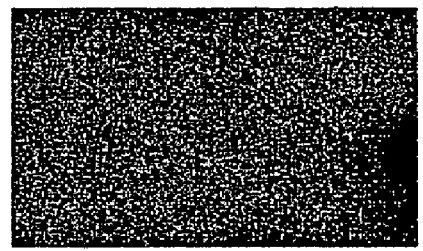

The surface localized effect is also confirmed by investigation of an antiparallel cell, having both sides covered by polyimide layers for planar alignment. The cell was filled with E7 nematic LC with 2% Aerosil® R812 silica. The cell was not glued, to enable examination of the open surfaces after application of a voltage. The silica has a tendency to acquire negative charge, which promotes transition to the homeotropic state when positive polarity is applied to the planar surface. The examination of the open surfaces between crossed polarizers shows that the surface to which was applied the plus sign of electrical pulse has homeotropic vertical alignment of molecules (FIG. 9a), and the opposite surface has horizontal planar alignment (FIG. 9b). After reassembling of the cell and reversing of the polarity the examination of the open surfaces shows the opposite effect: the surface which had vertical alignment, has now got planar alignment (FIG. 10a) and the surface which previously exhibited planar alignment now exhibits homeotropic alignment (FIG. 10b). These states are very stable and remain even after heating to the isotropic phase and cooling (FIGS. 11a,b).

The bistability of the present invention is based on the nature of interaction of nanoparticles with LC molecules and so may be applied to LC cells with different configurations and compositions. The effect is very stable and works in cells with different thicknesses and various different alignment arrangements. We have investigated cells with the following different configurations: homeoplanar, twisted, antiparallel, homeotropic with thickness varied between 1-50 μm. For planar alignment were used rubbed polyimide layers, photoaligned LPP layers and photolithographically-made grating surface. As liquid crystals have been used commercial materials: with positive dielectric anisotropy E7, ZLI2293, MLC6693, ZLI4792, dyed (blue) nematic ZLI3572, (black) ZLI4727, ZLI4714/3, ZLI4756/2, with negative dielectric anisotropy ZLI4788, ZLI1831, dyed (black) ZLI6092/1. It should be noted that use of a nematic LC with negative dielectric anisotropy provides bistable switching in the cell with homeotropic alignment on both surfaces, although optically the effect has lower contrast.

As nanoparticles have been used the silica nanoparticles Aerosil®, produced by Degussa-Huls(Germany) with thickness from 7 nm to 50 nm: hydrophobic R972, R974, R104, R106, R202, R805, R812, R816; hydrophilic R90, R200, R300, R380, OX50, MOX80.

We have also used silica microspheres SSNO3 with size 790 nm from Bangs Laboratories, Inc. All these nanoparticles have a tendency to acquire negative charge. Aluminium oxide C (13 nm) and specially-treated silica Aerosil® R504 have been used as nanoparticles having a tendency to acquire positive charge. We have also used hydrophobic titanium dioxide T805 (all these nanoparticles from Degussa-Huls). The effect has also been observed in nematic liquid crystal doped by clay (Garamite 1958, Claytone 40, both from Southern Clay Products). The mixture of nematic LC E7 filled with 3% clay Garamite 1958 provides bistable switching in a homeoplanar cell by applied pulse 5-10 ms and amplitude 70-80 V.

Figure 12:
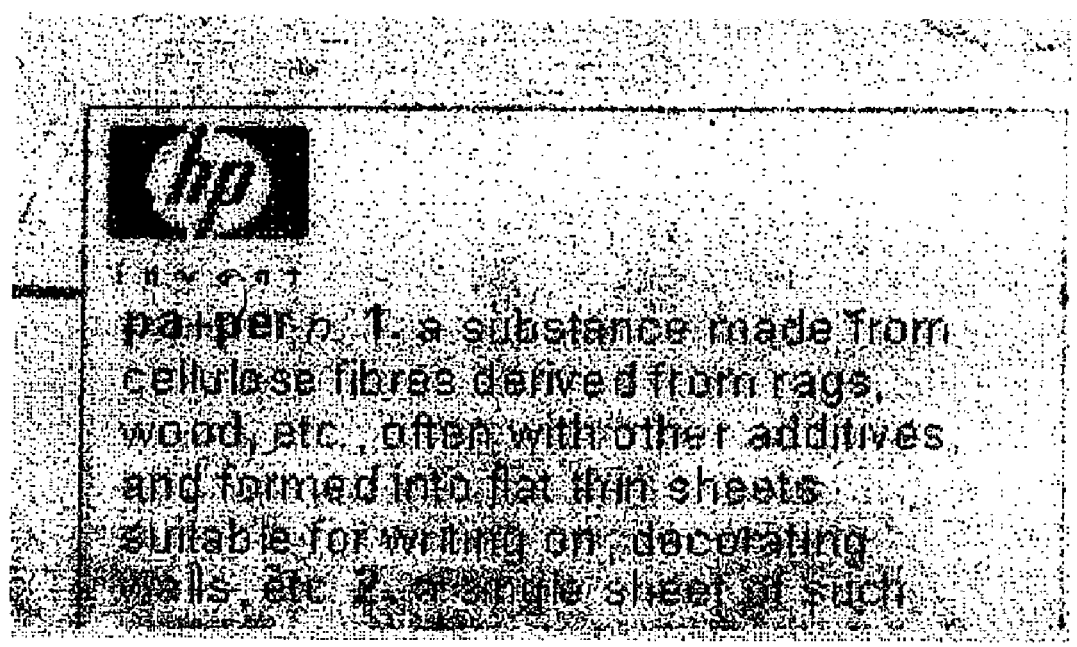
FIG. 12 is a picture of a device in accordance with an embodiment of the invention, displaying information.

Bistable switching between vertical and horizontal orientations of the molecules makes this effect applicable for colour switching in dyed LC. In this case the switching is between two stable states: coloured homeoplanar state and non-coloured transparent vertical state. FIG. 12 shows a stable dyed nematic cell formed using plastic 2×2 inch$^2$ cell walls. The cell has homeoplanar geometry: one substrate was treated to give homeotropic orientation and the other was treated with rubbed polyimide for the planar alignment. The cell thickness was 10 μm, set by polymer beads sprayed between the plastic substrates. The cell was filled with dyed blue nematic LC ZLI3572 doped with 2% silica (Aerosil® R974).

It is appreciated that certain features of the invention, which are for clarity described in the context of separate embodiments, may also be provided in combination in a single embodiment. Conversely, various features of the invention which are, for the sake of brevity, described in the context of a single embodiment, may also be provided separately or in any suitable subcombination.

Numerous modifications and variations of the present invention are possible in the light of the above teachings. It is therefore to be understood that within the spirit and scope of the appended claims, the invention may be practiced otherwise than specifically described herein.

The invention claimed is:

1. A bistable liquid crystal display device comprising:
   two cell walls enclosing a layer of a composition comprising nematic liquid crystal material and finely divided solid particles dispersed therein, at least one of said cell walls being translucent;
   at least one electrode on each of said cell walls for applying, an electric field across at least some of said liquid crystal material;
   a first surface alignment on an inner surface of one of said cell walls for inducing adjacent molecules of said liquid crystal material to adopt a first orientation, and a second surface alignment on an inner surface of the other of said cell walls for inducing adjacent molecules of said liquid crystal material to adopt a second orientation which is different from said first orientation;
   said nematic liquid crystal material being arranged so it has a first stable molecular configuration in response to a first unidirectional electric field of a first direction and suitable magnitude and duration being applied across said electrodes and a second stable molecular configuration in response to a second unidirectional electric field of a second direction and suitable magnitude and duration being applied across said electrodes, said second configuration being different from said first configuration, the first and second directions being opposite to each other;
   and drive electronics for applying the electric field to the electrodes, the electric fields and the cell walls being such that (A) (a) the first surface has a molecular alignment that is always homeotropic while the electric fields are applied to the electrodes, and (b) the second surface has a molecular alignment that is planar in response to the electric field extending in the first direction, and switches to homeotropic in response to the electric field switching from the first direction to the second direction, or (B) (a) the first surface has a molecular alignment that is always planar while the electric fields are applied to the electrodes, and (b) the second surface has a molecular alignment that is homeotropic in response to the electric field extending in the first direction, and switches to planar in response to the electric field switching from the first direction to the second direction.

2. A device as claimed in claim 1, wherein said particles are capable of triboelectric charging.

3. A device as claimed in claim 1, wherein said particles are capable of acquiring charge in suspension in a liquid crystal material.

4. A device as claimed in claim 1, wherein said particles have a size in the range 1 to 1000 nm.

5. A device as claimed in claim 1, wherein said particles have a size in the range 5 to 50 nm.

6. A device as claimed in claim 1, wherein said surface alignments induce planar alignment at substantially 90° to each other.

7. A device as claimed in claim 1, wherein said particles comprise at least one material selected from the group comprising silica, alumina, clay, and titanium dioxide.

8. A device as claimed in claim 1, wherein said particles are silica particles.

9. A device as claimed in claim 1, wherein said particles are present in a concentration of from 0.1% to 25% by weight of said composition.

10. A device as claimed in claim 9, wherein said particles are present in a concentration of from 1 to 15% by weight of said composition.

11. A device as claimed in claim 9, wherein said particles are present in a concentration of from 1 to 5% by weight of said composition.

12. A device as claimed in claim 1, further comprising at least one polarizer for distinguishing between different optical states of said liquid crystal material.

13. A device as claimed in claim 1, wherein said liquid crystal has a pleochroic dye dissolved therein.

14. The device of claim 1 wherein the drive electronics for applying the electric fields to the electrodes, the electric fields and the cell walls are such that (a) the first surface molecular alignment is always homeotropic while the electric fields are applied to the electrodes, and (b) the second surface molecular alignment is planar in response the electric field extending in the first direction and switches to homeotropic in response the electric field switching from the first direction to the second direction.

15. The device of claim 14 further including crossed polarizers, the cell walls being between the crossed polarizers; the drive electronics, the cell walls, the electrodes and the crossed polarizers arranged such that optical energy from outside the device and incident upon one of the cell walls can propagate through the device.

16. The device of claim 1 wherein the drive electronics for applying the electric fields to the electrodes, the electric fields and the cell walls are such that (a) the first surface molecular alignment is always planar while the electric fields are applied to the electrodes, and (b) the second surface molecular alignment is homeotropic in response the electric field extending in the first direction and switches to planar in response the electric field switching from the first direction to the second direction.

17. A bistable liquid crystal display device comprising:
two cell walls enclosing a layer of nematic liquid crystal material, at least one of said cell walls being translucent;
said liquid crystal material having finely divided solid particles dispersed therein, said particles having sizes in the range 1 to 500 nm;
at least one electrode on each cell wall for applying an electric field across at least some of said liquid crystal material;
a first surface alignment on an inner surface of one cell wall for inducing adjacent molecules of said liquid crystal material to adopt a first orientation;
a second surface alignment on an inner surface of the other cell wall for inducing adjacent molecules of said liquid crystal material to adopt a second orientation;
a structure for distinguishing between different optical states of said liquid crystal material; and
drive electronics connected to said electrodes for applying DC electric fields to said liquid crystal material, a first of the fields having a magnitude, a first direction and duration to cause the liquid crystal material to have a first stable optical state, a second of the fields having a magnitude, second direction and duration to cause the liquid crystal material to have a second stable optical state, the first and second directions being opposite to each other, the first and second stable optical states differing from each other,
the drive electronics being arranged to cause the electric field tines to be such that (A) (a) the first surface has a molecular alignment that is always homeotropic while the electric fields are applied to the electrodes, and (b) the second surface has a molecular alignment that is planar in response to the electric field extending in the first direction, and switches to homeotropic in response to the electric field switching from the first direction to the second direction, or (B) (a) the first surface has a molecular alignment that is always planar while the electric fields are applied to the electrodes, and (b) the second surface has a molecular alignment that is homeotropic in response to the electric field extending in the first direction, and switches to planar in response to the electric field switching from the first direction to the second direction.

18. The device of claim 17 wherein the drive electronics is arranged to cause the electric field lines to be such that (a) the first surface molecular alignment is always homeotropic while the electric fields are applied to the electrodes, and (b) the second surface molecular alignment is planar in response the electric field extending in the first direction and switches to homeotropic in response the electric field switching from the first direction to the second direction.

19. The device of claim 17 wherein the drive electronics is arranged to cause the electric field lines to be such that (a) the first surface molecular alignment is always planar while the electric fields are applied to the electrodes, and (b) the second surface molecular alignment is homeotropic in response the electric field extending in the first direction and switches to planar in response the electric field switching from the first direction to the second direction.

20. An electrophoretically-controlled bistable liquid crystal display device comprising:
a first cell wall and a second cell wall enclosing a layer of a composition comprising a nematic liquid crystal material having finely divided charged particles dispersed therein, at least one of said cell walls being translucent;
at least one electrode on each cell wall for applying an electric field across at least some of said liquid crystal material; and
a first surface alignment on an inner surface of said first cell wall for inducing adjacent molecules of said liquid crystal material to adopt a first orientation, and a second surface alignment on an inner surface of said second cell wall for inducing adjacent molecules of said liquid crystal material to adopt a second orientation which is different from said first orientation;
whereby said liquid crystal material can be switched to a first stable molecular configuration by the application of a DC electric field pulse of suitable field strength and duration to cause movement of charged particles to said first cell wall sa as substantially to prevent said first surface alignment from influencing alignment of molecules of liquid crystal material in said layer; and
said liquid crystal material can be switched from said first configuration to a second stable molecular configuration by the application of a DC electric field pulse of suitable field strength and duration and opposite polarity so as to cause movement of sufficient charged particles away from said first cell wall to permit said first surface alignment to influence alignment of molecules of liquid crystal material in said layer.

21. A device as claimed in claim 20, wherein said particles have a size in the range 1 to 1000 nm.

22. A device as claimed in claim 20, wherein said particles have a size in the range 5 to 50 nm.

23. A device as claimed in claim 20, wherein said first surface alignment is arranged for inducing planar alignment and said second surface alignment is arranged for inducing homeotropic alignment.

24. A device as claimed in claim 20, wherein said surface alignments are arranged for inducing planar alignment at substantially 90° to each other.

25. A device as claimed in claim 20, wherein said particles comprise at least one material selected from the group comprising silica, alumina, clay, and titanium dioxide.

26. A device as claimed in claim 20, wherein said particles are silica particles.

27. A device as claimed in claim 20, wherein said particles are present in a concentration of from 0.1% to 25% by weight of said composition.

28. A device as claimed in claim 20, wherein said liquid crystal has a pleochroic dye dissolved therein.

29. An electrophoretically-controlled bistable liquid crystal display device comprising:

a first cell wall and a second cell wall enclosing a layer of nematic liquid crystal material, at least one of said cell walls being translucent;

said liquid crystal material having finely divided charged particles dispersed therein;

at least one electrode on each cell wall for applying an electric field across at least some of said liquid crystal material;

a first surface alignment on an inner surface of said first cell wall for inducing adjacent molecules of said liquid crystal material to adopt a first orientation, and a second surface alignment on an inner surface of said second cell wall for inducing adjacent molecules of said liquid crystal material to adopt a second orientation which has different optical properties from said first orientation; and a structure for distinguishing between two different optical states;

wherein said liquid crystal material can be induced to adopt said first orientation by application of a DC pulse for causing at least some of said particles to migrate to said second surface alignment; and wherein said liquid crystal material can be induced to adopt said second orientation by application of a DC pulse for causing at least some of said particles to migrate to said first surface alignment.

30. An electrophoretically-controlled bistable liquid crystal display device comprising:

a first cell wall and a second cell wall enclosing a layer of nematic liquid crystal material, at least one of said cell walls being translucent;

said liquid crystal material having finely divided charged particles dispersed therein;

at least one electrode on each cell wall for applying an electric field across at least some of said liquid crystal material; and a first surface alignment on an inner surface of said first cell wall for inducing adjacent molecules of said liquid crystal material to adopt a planar alignment, and a second surface alignment on an inner surface of said second cell wall for inducing adjacent molecules of said liquid crystal material to adopt a homeotropic alignment;

whereby said liquid crystal material can be switched to a stable homeotropic alignment by the application of a DC electric field pulse of suitable field strength and duration to cause movement of charged particles to said first cell wall so as substantially to prevent said first surface alignment from influencing alignment of molecules of liquid crystal material in said layer; and said liquid crystal material can be switched from said stable homeotropic alignment to a stable planar alignment by the application of a DC electric field pulse of suitable field strength and duration and opposite polarity so as to cause movement of sufficient charged particles away from said first cell wall to permit said first surface alignment to influence alignment of molecules of liquid crystal material in said layer.

* * * * *